(12) United States Patent
Hill et al.

(10) Patent No.: US 8,973,444 B2
(45) Date of Patent: Mar. 10, 2015

(54) TRACKING OBJECTS IN CONDUITS

(75) Inventors: David John Hill, Weymouth (GB); Magnus McEwen-King, Farnham (GB)

(73) Assignee: Optasense Holdings Ltd. (GB)

( * ) Notice: Subject to any disclaimer, the term of this patent is extended or adjusted under 35 U.S.C. 154(b) by 900 days.

(21) Appl. No.: 13/059,806

(22) PCT Filed: Aug. 20, 2009

(86) PCT No.: PCT/GB2009/002032
§ 371 (c)(1),
(2), (4) Date: Feb. 18, 2011

(87) PCT Pub. No.: WO2010/020781
PCT Pub. Date: Feb. 25, 2010

(65) Prior Publication Data
US 2011/0139538 A1    Jun. 16, 2011

(30) Foreign Application Priority Data

Aug. 21, 2008  (GB) .................................. 0815297.7

(51) Int. Cl.
*G01H 9/00* (2006.01)
*G01M 3/24* (2006.01)
(Continued)

(52) U.S. Cl.
CPC .............. *G01M 3/243* (2013.01); *F17D 5/06* (2013.01); *G01D 5/48* (2013.01); *G01H 9/004* (2013.01); *G01P 3/14* (2013.01)
USPC ............................................. 73/643; 73/623

(58) Field of Classification Search
USPC ............................ 73/655, 622, 623, 643, 644
See application file for complete search history.

(56) References Cited

U.S. PATENT DOCUMENTS 3,949,353 A   4/1976  Waters et al.
4,311,391 A   1/1982  Gilmour
(Continued)

FOREIGN PATENT DOCUMENTS

CN    2758749 Y    2/2006
CN    101231155 A  7/2008
(Continued)

OTHER PUBLICATIONS

Li, "Recent Applications of Fiber Optic Sensors to Health Monitoring in Civil Engineering", Engineering Structures, Butterworth, GB, vol. 26, No. 11, Sep. 1, 2004, pp. 1647-1657.
(Continued)

*Primary Examiner* — Lisa Caputo
*Assistant Examiner* — Rose M Miller
(74) *Attorney, Agent, or Firm* — McDonnell Boehnen Hulbert & Berghoff LLP (57) ABSTRACT

Methods and apparatus for tracking objects in conduits, especially for tracking the movement of a pig in a pipeline, are disclosed. Distributed acoustic sensing is used to obtain signal returns from a plurality of discrete longitudinal sensing portions of a fibre optic cable which is laid along the length of the conduit. The method involves detecting an acoustic signature corresponding to the object moving in the conduit. The acoustic signature may comprise a series of pressure pulses caused by the object traversing joints etc. in the conduit. Preferably the method involves detecting pressure waves caused by the object as it moves through the conduit. Detecting the characteristic pressure wave signal provides discrimination of the object from other acoustic disturbances. In pipeline applications a pig can be tracked in real time, if the pig stops moving an alert can be generated and the location of the pig will be known.

18 Claims, 4 Drawing Sheets

(51) Int. Cl.
*G01D 5/26* (2006.01)
*F17D 5/06* (2006.01)
*G01D 5/48* (2006.01)
*G01P 3/14* (2006.01)

(56) References Cited

U.S. PATENT DOCUMENTS

| | | | |
|---|---|---|---|
| 4,313,185 A | | 1/1982 | Chovan |
| 4,363,114 A | | 12/1982 | Bucaro et al. |
| 4,590,799 A | * | 5/1986 | Brown et al. .................. 73/587 |
| 4,747,309 A | | 5/1988 | Weir |
| 4,927,232 A | | 5/1990 | Griffiths |
| 5,417,112 A | * | 5/1995 | Rosenberg .................. 73/587 |
| 6,731,570 B1 | | 5/2004 | Langdon |
| 6,847,207 B1 | | 1/2005 | Veach et al. |
| 7,946,341 B2 | * | 5/2011 | Hartog et al. ............. 166/254.1 |
| 8,020,616 B2 | * | 9/2011 | Greenaway ............... 166/254.2 |
| 2006/0028636 A1 | | 2/2006 | Payton |
| 2006/0165344 A1 | * | 7/2006 | Mendez et al. .................. 385/13 |
| 2006/0225507 A1 | | 10/2006 | Paulson |
| 2008/0088846 A1 | | 4/2008 | Hayward |
| 2008/0144016 A1 | | 6/2008 | Lewis et al. |
| 2009/0188665 A1 | * | 7/2009 | Tubel et al. ............ 166/250.01 |

FOREIGN PATENT DOCUMENTS

| | | |
|---|---|---|
| EP | 1 912 049 | 4/2008 |
| EP | 1912050 | 4/2008 |
| GB | 2 442 647 | 4/2008 |
| JP | 08 233932 | 2/1995 |
| JP | 08 233564 | 9/1996 |
| JP | 2000 088561 | 3/2000 |
| WO | WO 2010/010318 | 1/2010 |

OTHER PUBLICATIONS

Hsu, et al., "Velocity Filtering of Acoustic Well Logging Waveforms", IEEE Transactions of Acoustics, Speech and Signal Processing, vol. 37, No. 2, Feb. 1989, pp. 265-274.
Nagano, et al., "Automatic Algorithm for Triaxial Hodogram Source Location in Downhole Acoustic Emission Measurement", Geophysics, vol. 54, No. 4, Apr. 1989, pp. 508-513.
Unpublished U.S. Appl. No. 13/059,795, filed Feb. 18, 2011 in the name of Hill et al., entitled: "Conduit Monitoring".
Preliminary Amendment filed in U.S. Appl. No. 13/059,795 on Feb. 18, 2011.
Unpublished U.S. Appl. No. 13/059,810, filed Feb. 18, 2011 in the name of Hill et al., entitled: "Fibre Optic Acoustic Sensing".
Preliminary Amendment filed in U.S. Appl. No. 13/059,810 on Feb. 18, 2011.
Non-Final Office Action issued in U.S. Appl. No. 13/059,795, mailed on Jul. 1, 2013.
Reply to Non-Final Office Action in U.S. Appl. No. 13/059,795, filed on Oct. 1, 2013.
Non-Final Office Action issued in U.S. Appl. No. 13/059,810, mailed on Apr. 11, 2013.
Reply to Non-Final Office Action issued in U.S. Appl. No. 13/059,810, filed on Oct. 11, 2013.

* cited by examiner

TRACKING OBJECTS IN CONDUITS

FIELD OF THE INVENTION

The present invention relates to tracking objects in conduits, and more particularly to tracking objects such as cleaning or inspection apparatus, e.g. pigs, in pipelines.

BACKGROUND OF THE INVENTION

Pipelines are the most economically viable method of transporting fluid assets, most commonly oil and gas, but other types of pipeline also exist. A vast pipeline infrastructure exists today responsible for gathering, transporting and distributing these natural resources, with over three quarters of a million kilometers of oil and gas pipelines in the US alone. The continuing proper operation of these pipelines is of paramount importance, and failures carry massive economic loss, environmental impact and potentially catastrophic physical damage also.

Significant efforts are therefore made to maintain, monitor and inspect pipelines. The sheer size of many pipeline networks however, and the fact that many kilometres of pipelines consist of underground or sub-sea installations makes effective and efficient monitoring a difficult problem.

To monitor, inspect and maintain pipelines use is made of various inspection and maintenance tools which are inserted into the pipeline and carried through the pipeline by the pressure of the fluid therein. There are a variety of different objects, commonly referred to as "pigs" that may be employed. A simple cleaning pig may comprise an object shaped to brush or scrape the inner walls of the pipeline as it passes to provide a cleaning action. An intelligent monitoring pig may be comprise various sensors and an onboard processor and can be a very expensive, very complex instrument.

Pigs are also commonly used during the commissioning of a pipeline, for instance to remove debris from the inside of the pipeline and to dewater the inside of the pipeline.

Use of a pig for inspection or cleaning is commonly referred to as pigging. Pigging is often carried out with largely uninterrupted fluid flow through the pipeline and thus is advantageous in that pipeline flow need not be stopped to perform routine inspection and maintenance. However, occasionally pigs may become stuck in a pipeline. This can occur for many reasons, for example a cleaning pig may scrape the walls of the pipeline to clean any material therefrom. In an oil pipeline for example build up of various hydrocarbon products such as waxy or semi-solid residues can occur. An area of excessive residue build up may present too much of an obstacle to a pig. Also, in normal operation the debris from the cleaning action builds up in front of the pig and in some instances can block passage of the pig. Damage to the pipeline, such as denting or buckling, may also cause a change in the inner dimensions preventing ease of passage of the pig.

A pig which becomes stuck in the pipeline obviously causes severe disruption to the pipeline. The pig may block some or all of the flow and may result in the pipeline being shut down. Obviously it is desirable to clear such a blockage as soon as possible. Pipeline downtime can have significant cost implications and the consequential effects of a failure of supply can be significant in some applications. In addition, as mentioned previously, some inspection pigs are very expensive and there can be cost implications in the pig itself being inoperative.

To clear the blockage it may be necessary to actually cut into the pipeline and remove the offending pig. Clearly however there is a need to detect that the pig has become stuck. The fact a pig is causing a blockage may be detectable by flow monitoring apparatus but it may not be possible to determine whether the pig is still moving, albeit slowly, or whether the pig has stopped moving. For a simple cleaning type pig, the typical pigging run may simply involve inserting the pig at a pig insertion point in the pipeline and later extracting it from a downstream extraction point a certain time later. Detection that the pig has become stuck may only occur when the pig fails to appear at the extraction point within a certain time window after it was inserted. Further, when it is determined that a pig is stuck the actual location of the pig in the pipeline needs to be identified. For a pig without any sensors or transmitters locating the blockage can represent a challenge given that the pipeline may be buried and may be many kilometres long.

It is therefore an object of the present invention to provide methods and apparatus for tracking and/or locating objects moving in a conduit.

SUMMARY OF THE INVENTION

In a first aspect the present invention provides a method of tracking movement of an object in a conduit comprising: taking data corresponding to signal returns from interrogation of an optic fibre positioned along the path of said conduit to provide distributed acoustic sensing; and processing the returns from each of a plurality of discrete longitudinal sensing portions to detect an acoustic signature associated with movement of said object in said conduit and determine the origin of said acoustic signature.

The method of this aspect of the present invention uses distributed acoustic sensing to provide tracking of an object in a conduit, such a tracking of a pig in a pipeline. Optic fibre based distributed acoustic sensing is a known technique in which vibrations of an optic fibre are detected by interrogating a fibre with light and detecting the variations in the light transmitted or reflected due to the vibrations. The signal is analysed such that the fibre, in effect, provides series of independent, acoustic sensors distributed across the length of the fibre. Fibre-optic distributed acoustic sensing is provided by interrogating the fibre with optical pulses at different frequencies in many embodiments. Such embodiments typically operate by detecting Rayleigh backscattered light from the sensing fibre and using the frequency relationship of the interrogating pulses to determine the acoustic signals incident on the fibre along its length. Any suitable distributed sensing technique may be employed however.

Such distributed fibre optic sensors have been proposed for perimeter monitoring and also for monitoring oil and gas pipelines, for example to detect nearby ground works that could threaten the pipeline.

The present invention uses a characteristic signature caused by movement of the object in the conduit to allow detection, and hence tracking, of the object. The present invention therefore does not operate on a loudest sensor type approach, which is the normal approach to acoustic tracking, but instead uses the acoustic signature to detect and track the object.

Conveniently detecting the acoustic signature comprises detecting a pressure impulse caused by travel of the object in the conduit. It has been found that a pig travelling through a pipeline may produce a series of pressure impulses. As the pig passes each girth weld or joint in the pipe it encounters additional resistance and a slight overpressure builds behind the pig. As the pig subsequently passes the weld a pressure wave is released travelling in both directions down the pipe. The frequency of the pulses depends on the spacing of the welds and the velocity of the pig. A similar effect may occur when passing through certain valves. In general, any change in the internal properties of the conduit which could create a greater resistance to object movement can lead to a pressure build up that, when released, can create a pressure impulse. Where there are several locations giving rise to a pressure pulse in the conduit, such as a plurality of joints between sections of conduit, passage of the object will give rise to a repetitive series of pressure pulses. As mentioned frequency of the impulse in a pipeline application may depend on the speed of the pig and the frequency of the welds, joints and valves etc. If the pig is travelling at roughly constant speed and the joints are spaced evenly apart the motion of the pig will create a regular series of pressure impulses which can be used as the acoustic signature. Thus the location of the pig may be determined by locating an acoustic disturbance in one of the discrete sensing portions of fibre that would match a series of previous pulses.

Preferably the step of detecting the acoustic signature comprises detecting a pressure wave propagating through the conduit, due to a pressure impulse caused by travel of the object in the conduit. As mentioned, the pressure impulse will lead to a pressure wave travelling in both directions in the conduit. The pressure pulse can travel for significant distances, especially in high pressure pipelines and the like. Thus the acoustic signature may comprise first and second acoustic disturbances propagating away from each other in opposite directions in the conduit. In other words if the pressure impulse is caused, for example by a pig crossing a weld at a first location, this will lead, in a first frame of data, to an acoustic disturbance in the sensing portion of fibre corresponding to the first location. In a subsequent frame an acoustic disturbance may be detected in both of the adjacent sensing portions of fibre. In another subsequent frame an acoustic disturbance may be detected in the next portions of fibre in each direction and so on. Looking for this characteristic spreading disturbance allows identification of the pig even in the presence of relatively high noise. As the pressure wave propagates through the conduit the acoustic disturbance is detected by a plurality of sensing portions of fibre and the returns from a plurality of discrete sensing portions can be used to detect the object.

Identifying the first and second acoustic disturbances propagating in opposite directions also allows the location of the origin of the pressure wave to be determined, thus locating the object in the conduit at the time that the pressure wave was generated. Using the pressure wave generated in the conduit, e.g. pipeline, to locate an object in the conduit represents a novel aspect of this embodiment of the invention.

The speed of propagation of the pressure wave in the conduit will depend upon the fluid within the conduit and the pressure of the fluid. Typically, the speed of the pressure wave along the conduit will be the same in each direction and hence the first and second acoustic disturbances have substantially the same speed. Thus the method may discriminate acoustic disturbances due to the object by checking that the first and second acoustic disturbances have substantially the same speed along the conduit.

The method may therefore comprise identifying the first and second acoustic disturbances propagating in different directions along the conduit from a point of common origin. In a waterfall type plot showing time on one axis and position along the conduit on another axis and plotting the intensity of the acoustic disturbances, the pressure wave will appear as a characteristic V shape—due to the pressure waves travelling in opposite directions along the pipeline at a substantially constant speed. This V shape represents the acoustic signature of the object and can be used to detect and locate the object.

In one embodiment the step of processing the returns comprises the steps of, for each of a plurality of test positions along the conduit: forming a first subset of data corresponding to a plurality of frames of data from discrete sensing portions corresponding to portions of the conduit on one side of the test position; forming a second subset of data corresponding to a plurality of frames of data from discrete sensing portions corresponding to portions of the conduit on the opposite side of the test position; and processing the first and second subsets to determine the presence of an acoustic disturbance in the first and second subsets propagating away from the test position.

In other words the method involves assuming, for each of a plurality of test locations along the conduit, that such test location might be the location of origin of a pressure pulse. The method may be performed iteratively or in parallel, for each test location. For each test location first and second subsets of data are formed representing the returns from sensing portions of the fibre on first and second sides of the test location respectively. Each subset is then processed to determine whether there is an acoustic disturbance propagating away from the test location.

Conveniently the number of frames of data is sufficiently large to allow detection of the acoustic disturbances if present but is small enough such that only one pressure wave is expected in each subset. As used herein the term frame of data is taken to mean a set of data returns corresponding to a particular period of time, either a single interrogation of the fibre or the integrated results of several interrogations. Thus a short enough period is chosen such that it is expected that the object would produce only a single pressure wave during such period.

Given an appropriate choice of data, for each of the first and second subsets of data the step of determining the presence or not of an acoustic disturbance corresponds to the step of detecting a linear pattern of disturbances, i.e. signals corresponding to a single acoustic disturbance travelling at a constant speed.

In one embodiment therefore the method comprises processing the first and second subsets by applying linear regression to each of the first and second subsets for each test position. Linear regression, as the skilled person will appreciate, determines the best linear fit to the data and gives a measure of the fit and the residuals, i.e. a measure of how close the fit is to the data. In this embodiment the linear regression is therefore applied to the data corresponding to position along the conduit from the test position at which an acoustic disturbance is detected and the time of such detection. The resulting linear fit for each subset can then be analysed to determine how closely the data corresponds to an acoustic disturbance propagating away from the test location.

As mentioned the method is performed at a plurality of different test positions. Each different sensing portion of fibre may be trialled as a test position, i.e. the whole fibre is examined. Alternatively the test positions may lie within a range banded by a previous knowledge of the location or expected location of the object. In some applications knowledge of when and where the object is inserted into the conduit may be used to restrict the initial search space and, as the object is tracked, the last known position may be used to restrict the search for a new detection. Additionally or alternatively at least some of the first positions may be chosen on an acoustic disturbance having been detected at or near that location.

After the various test positions have each been trialled the method may comprise identifying one or more test positions having the lowest residuals, i.e. those test positions with the best linear fits. The test position leading to the lowest, or several lowest residuals may be identified, or any test fit having residuals below a threshold may be identified. The identified test fits indicate the most likely candidates for a test position where the object has caused a pressure wave propagating outward from that test position. The actual linear fit determined for each of these test locations may then be examined. The linear fit may be examined for a gradient for each of the first and second subsets which indicates an acoustic disturbance which is propagating away from the test position. In some cases the expected speed range of the acoustic disturbance may be known, either from a knowledge of the flow conditions within the conduit and/or from a previous detection of a propagating acoustic disturbance and thus the method may comprise the step of identifying test positions wherein the linear fit of the first set has a gradient within a first expected range and the linear fit of the second set has a gradient within a second expected range. As mentioned above the speed of the pressure wave may be substantially the same in each direction and so the method may comprise the step of identifying test positions wherein the magnitude of the gradient for the linear fit for the first subset is substantially equal to the magnitude of the gradient for the linear fit for the second subset. In all cases the fit to both subsets of data should have low residuals—to discount the possibility of two unrelated pressure waves happening to have crossed at the test location and the residuals could be compared to a threshold.

As a result an acoustic signal which matches the expected acoustic signature of a pressure wave generated at the test location can be identified. This may be used as an indication that the object was at the test location at the particular time.

Conveniently however any acoustic signals identified which may be due to the object may be compared with the results of processing of other frames of data to determine an object track. In other words the results of processing of several different sets of frames of data may be used to refine the location of the object. It will be noted that in some applications, such as the application of tracking a pig in a pipeline, the number of objects in the section of pipeline under observation may be known in advance. For example it may be known that there is a pig, and only one pig, in the pipeline being monitored by a particular distributed acoustic sensor. This knowledge can be incorporated into the tracking algorithm.

The pressure wave created by the object moving through the conduit will, as mentioned, travel along the conduit and cause an acoustic disturbance of the conduit. The acoustic disturbance at each different part of the conduit may last for a variable time, i.e. some parts of the conduit may ring for a while. Thus, to provide a degree of normalisation of the data the method may comprise applying a leading edge detection step to identify the leading edge of any acoustic disturbance detected by a discrete sensing portion. Any data following the leading edge for a certain period of time may be disregarded to allow clearer detection of the pressure wave.

This embodiment of the present invention therefore provides a very simple and easy method of tracking movement of objects within conduits, especially pigs in pipelines using optic fibre distributed acoustic sensors.

Existing optic fibres running along the path of a conduit can be employed for sensing purposes, by connecting suitable interrogation and processing apparatus. For example, a significant proportion of pipelines will have pre-existing lengths of optic fibre running along the path of the pipeline. These are typically communications cables and/or for SCADA (Supervisory Control and Data Acquisition) of the pipeline which were laid at the same time as the pipeline for obvious logistical reasons. In such cases, because existing cables can be made to form part of the monitoring apparatus, relatively long spans of pipeline can be monitored with only limited access to the pipe required.

The sensing fibre for distributed sensing may be located inside the conduit, on the exterior surface of the conduit, directly buried adjacent to the conduit or in a separate adjacent conduit, in various different embodiments. The same fibre may be located at least partly within and at least partly without the conduit. There is no prescribed position for the sensing fibre, provided its location is such that it is able to detect a sufficient response to a pressure pulse within the conduit. Because of the high sensitivities possible in fibre optic sensing, whereby induced phase differences can be measured using interferometric techniques, the potential scope for positioning the fibre, or the scope for selecting an existing fibre is large. Generally speaking however, it is preferable for the fibre to be located at or within approximately 3 m of the fluid carrying conduit, and more preferably at or within approximately 1.5 m from the centreline of the conduit to be monitored.

The spatial resolution of the distributed fibre optic sensing is less than or equal to 30 m in many embodiments, and less than or equal to 20 m or 10 m in certain embodiments. In certain embodiments the optic fibre is interrogated to provide sensed data over a distance greater than or equal to 20 km, and distances of greater than or equal to 30 km or 40 km are achievable in other embodiments.

This aspect of the present invention therefore provides a method of monitoring the movement of an object in a conduit in real time. As the skilled person will appreciate fibre optic distributed acoustic sensors can be sampled over lengths of up to 40 km or more at high sample rates. Several frames of data may be collected and then analysed as described above to determine the current location of the object. The speed of the object within the conduit may also be determined. The method may comprise generating an alert if the object stops moving and/or drops below a speed threshold. The fact that the object has stopped moving can be determined by detecting the absence of the acoustic signature in a certain period of time. For a pipeline application the fact that the object has stopped moving may indicate that the object, e.g. the pig, has become stuck in the pipeline. An indication that the object has slowed below a certain threshold speed may be indicative that the object is likely to become stuck. The alert may be generated in a number of ways including an audible alert, a visual alert and/or generation of an electronic message or the like. A conduit automated control system may be arranged to take certain action on generation of the alert, for instance controlling the flow parameters of the conduit.

If the object has stopped and an alert is generated the location of the object in the conduit may be determined by looking at the last known position of the object. In a pipeline application this will generally locate the object to within a particular section of pipeline, i.e. between joints. Thus the fact that the pig has become stuck, and the location of the pig to an individual section of pipe can be determined almost instantaneously.

As mentioned above when the object is moving through the conduit the existence of welds etc. will lead to the pressure impulse and associated pressure wave as the object moves past the weld. Such pressure waves may also be generated when the object passes other restrictions within the conduit, such as build up of material on the inner walls of the conduit or dents or the like changing the internal profile of the conduit. During a pigging run pressure impulses will be expected at locations of the welds, joints, valves etc. but a pressure impulse would not be expected in a continuous section of conduit. Thus detection of a pressure wave, as described above, corresponding to a section of conduit where no pressure wave would normally be expected may be indicative of change to the condition of the internal surface of the conduit at that point. The expected location of pressure pulse may be known from knowledge of the location of joints and valves etc. within the conduit and/or from data acquired from previous pigging runs.

For example, some pigs intended for pipeline inspection comprise a series of radial extending fingers arranged such that the finger are not substantially in contact with the conduit walls in passage of the object through a normal section of conduit but that such fingers may contact sections of the conduit that intrude into the inner space of the conduit, i.e. the fingers do not touch the walls if the conduit is undamaged but will touch the walls if the conduit is dented or buckled. If such a pig were to pass a dented section of conduit the finger may deform, at least whilst passing the dented section. This may lead to a pressure impulse as the damaged section is cleared. This pressure impulse may be detected and used to determine the location of the damaged section of conduit.

Even if a detectable pressure pulse is not detected when the object passes a damaged section of conduit or a section of conduit with a build up of material on the inside walls, passage of the object through such a section may generate an acoustic disturbance. This acoustic disturbance may be detected and used with the known location of the pig, due to the tracking method described above, to determine a location of the conduit that may be degraded and may need further inspection.

The method may therefore comprise the step of recording the location of object at which any significant acoustic signal is generated.

The method may also comprise determining the response to said pressure wave at each of a plurality of discrete longitudinal sensing portions; and deriving from said plurality of measurements a conduit condition profile. A pressure wave generated by the object, as mentioned, travels in both directions along the length of the conduit.

This pressure wave can be detected and used to determine the location of the object as mentioned above. However in one embodiment the pressure wave is also used to determine a condition profile for the conduit. As mentioned previously it has been found that such pressure pulses are capable of travelling large distances through pipelines with little attenuation, and therefore a single pulse can provide sufficient excitation for monitoring 20, 30 or 40 km or more of conduit.

In effect the pressure pulse acoustically excites each section of the conduit in turn and the response can be measured to determine a condition profile.

The condition profile of the conduit need not be explicitly analysed to determine corresponding physical characteristics (although this is possible). More use may be derived by monitoring a conduit over a period of time to obtain one or more profiles, and comparing these profiles to determine changes in characteristics. Thus two conduit profiles may be obtained corresponding to two dates having a known time separation. For instance, for a pipeline, a first profile may be obtained during a first pigging run and compared to a second profile obtained during another pigging run some time later. Differences in the profile can be determined using data analysis techniques to obtain information concerning which portions of the pipe have undergone physical changes, and hence the location of those changes. More complex statistical analysis of profiles can be undertaken if a set of multiple profiles is built up over time, and profiles will typically be obtained during each pigging run for this purpose. Additionally or alternatively profiles can be taken before or after planned maintenance or repair work to characterise known changes to the pipeline.

Changes in the conduit, (and possibly conditions of any material, such as the ground, surrounding the conduit) can therefore be monitored over time intervals, and the location and characterising information concerning those changes can be provided. This information may prompt further actions, such as maintenance, cleaning, physical inspection or repair.

Whilst the movement of an object such as a pig within a conduit may provide a sufficient pressure pulse for conduit condition monitoring the conduit may be also be provided with an impulse for generating additional pressure pulses when there is no pig moving within a section of pipeline. The impulser may be anything capable of exciting pressure pulses within the conduit. Providing an impulse allows conduit condition monitoring in periods when no pigging is scheduled. The impulser also provides another means of locating a pig within a conduit as the response of a section of conduit having a pig therein to a pressure pulse imparted by the impulse will be different to its normal response when no pig is present. Thus introducing a pressure pulse into the conduit and looking for a section of conduit with a non standard response could be used as another method of detecting an object within the conduit.

In some embodiments the amplitude response to the pulse wave is measured. This may be performed by integrating across the available bandwidth for each channel. Further analysis of the data returned from distributed sensing however allows the spectral content of each channel to be provided in certain embodiments, enabling enhanced condition monitoring capability. Distributed acoustic sensing in embodiments of the present invention senses seismic signals (both P pressure and S shear vibration waves) which are within a bandwidth from 0 Hz-5 kHz. Higher frequencies are commonly strongly attenuated however, and the range from 0 Hz to 1 kHz is more commonly monitored.

Given that the object travels through the conduit a profile may be gathered for a particular section of conduit both before and after the passage of the object. For example, a pig in a pipeline which is upstream of a first section will generally generate one or more pressure waves as it passes joints in the pipe. The pressure wave travelling downstream will excite the section of pipe before the pig has travelled through the first section of pipe. Some time later the pig will have passed the first section and will be downstream. An upstream pressure wave generated by the pig will again excite the first section allowing another condition profile to be obtained. In this way the condition of the first section can be compared before and after passage of the pig. The two responses could give an indication of a change caused by passage of a pig, for instance an indication of how effective the pig has been at removing material from the inner walls of the pipeline. The method may therefore comprise the step of comparing, for at least part of the conduit, a conduit condition profile from before passage of the object with a conduit condition profile after passage of the object.

As mentioned previously the method is particularly suited to tracking movement of a pig in a pipeline. As used in the present specification the term pig is taken to refer to any apparatus or tool which is deliberately inserted into a pipeline for a purpose related to the operation or construction of a pipeline such as inspection, maintenance and repair for instance.

The method may operate on data acquired by a remote distributed acoustic sensor or, for the purposes of locating a pig that has become stuck, on data previously acquired. As mentioned however the method may be performed in real time or near real time. The method may comprise the step of interrogating said optic fibre. Interrogating said optic fibre may comprise repetitively launching a plurality of optical pulses into the fibre and detecting radiation which is Rayleigh backscattered from said optic fibre.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

A further aspect of the invention provides apparatus for tracking a pig in a pipeline comprising: an optic fibre interrogator adapted to interrogate an optic fibre and provide distributed acoustic sensing; and a processor adapted to receive sensed data from said interrogator and detect an acoustic signature associated with movement of said pig in said pipeline and to determine the location of said pig.

The apparatus according to this aspect of the invention provides all of the same advantages and may utilize all the same embodiments as described above with reference to the first aspect of the invention.

In particular said processor may be adapted to detect a pressure wave caused due to movement of the pig in the pipeline. The processor may be adapted to generate an alert if the pig stops moving and/or drops below a speed threshold. The alert preferably comprises an indication of the location of the pig in the pipeline.

The invention extends to methods, apparatus and/or use substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
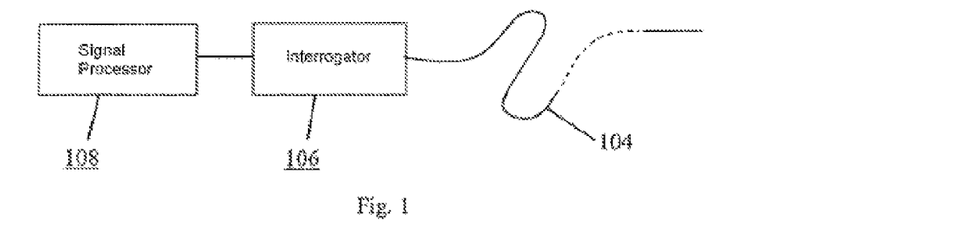
FIG. 1 illustrates the basic components of a distributed fibre optic sensor.

FIG. 1 shows a schematic of a distributed fibre optic sensing arrangement. A length of sensing fibre 104, which may be standard optic fibre such as used in telecommunication applications, is connected at one end to an interrogator 106. The output from interrogator 106 is passed to a signal processor 108 and optionally a user interface, which in practice may be realised by an appropriately specified PC. The sensing fibre can be many kilometres in length, and in this example is approximately 40 km long.

The interrogator launches an interrogating optical signal, which may for example comprise a series of pulses having a selected frequency pattern, into the sensing fibre. The phenomenon of Rayleigh backscattering results in some fraction of the light input into the fibre being reflected back to the interrogator, where it is detected to provide an output signal which is representative of acoustic disturbances in the vicinity of the fibre. The form of the optical input and the method of detection allow a single continuous fibre to be spatially resolved into discrete sensing lengths. That is, the acoustic signal sensed at one sensing length can be provided substantially independently of the sensed signal at an adjacent length. The spatial resolution in the present example is approximately 10 m, resulting in the output of the interrogator taking the form of 4000 independent data channels.

The distributed acoustic sensor may, for instance, by a distributed acoustic sensor such as described in GB patent application publication No. 2,442,745, the contents of which are hereby incorporated by reference thereto.

In this way, the single sensing fibre can provide sensed data which is analogous to a multiplexed array of adjacent sensors, arranged in a linear path, which may be straight or curved depending on the application.

Figure 2:
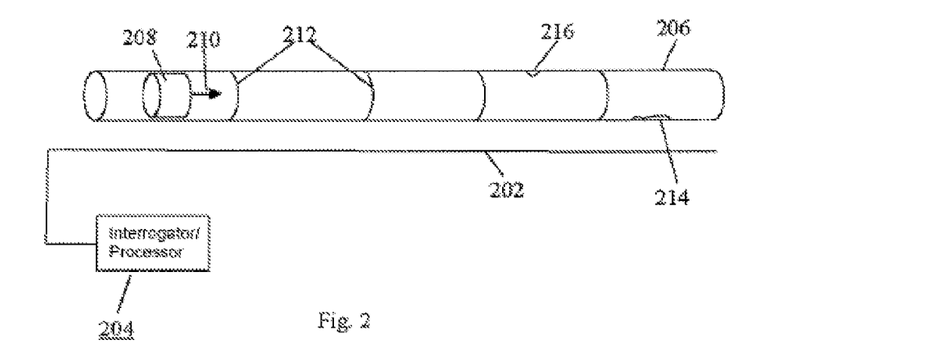
FIG. 2 shows a fibre sensor arranged along a length of pipeline.
Figure 3:
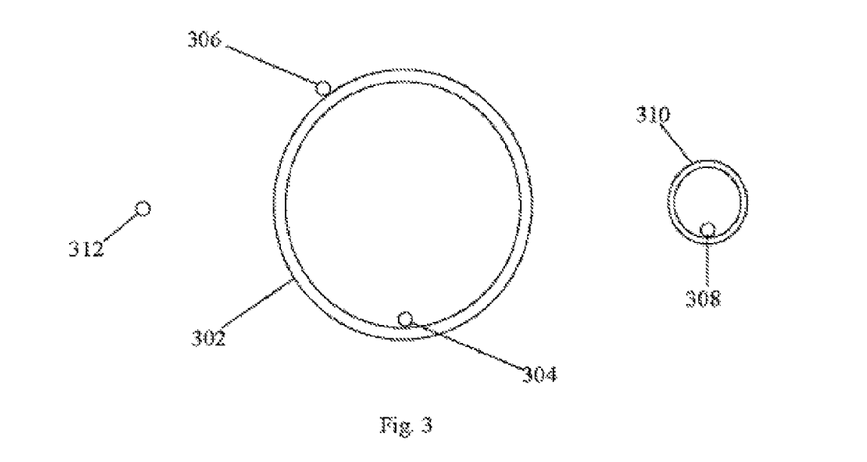
FIG. 3 is a cross section of a pipeline and sensing fibres.

FIG. 2 shows an arrangement employing a method according to the present invention, whereby a sensing fibre 202 (and associated interrogator and/or processor 204) is arranged along the path of a conduit, which in this example is a pipeline 206. The fibre is preferably arranged to follow the path of the pipeline. In this way the various discrete sensing portions of fibre correspond directly to longitudinal section of pipe. However other fibre arrangements may be used—in which case it may be necessary to know the arrangement of the fibre relative to the pipeline to allow tracking within the pipeline. The fibre may be position inside or outside of the conduit. FIG. 3 shows a cross section of a pipe 302 with possible locations of a sensing fibre able to detect the response of the pulse in the pipe.

The pipe in the present example has an internal diameter of 1200 mm and 50 mm carbon steel walls, carrying natural gas at approximately 80 bar. The pipe may be buried approximately 1-2 m below the surface which may be ground level or the seabed in certain situations. Fibre 304 illustrates a fibre located inside the interior bore of the pipe 302, resting on the bottom of the pipe. Fibre 306 illustrates a fibre bonded to the exterior of the pipe, while fibre 308 illustrates a fibre located in a separate cable carrying conduit 310, located approximately 1.5 m from the centreline of the gas transmission pipeline. Conduit 310 is typically laid at the time of installing the pipeline to carry communication and/or SCADA lines. Fibre 312 illustrates a fibre directly buried in the ground alongside the pipeline, at approximately 1 m from the pipe centreline.

It will be understood that for each different fibre placement, the measured response to the pressure pulse in the pipe will be different, and will depend on different factors. The signal sensed by fibre 308 will depend on the transfer characteristics of the ground between pipe 302 and conduit 310, for example, while sensing fibres 304 and 306 will be less affected. As will be explained below however, this does not adversely affect the present invention, and any fibre placement which produces a reliable response to the pressure pulse can be used. The fibre preferably extends along the length of pipeline it is wished to track. Distributed acoustic sensing has been demonstrated in fibre lengths of up to and beyond 40 km. Thus a single distributed acoustic sensor can provide pig tracking within 40 km of pipeline. A series of distributed acoustic sensors could be arranged to provide tracking over longer lengths of pipeline. For lengths of pipeline of the order of 80 km or so a single fibre could be used along the length of the fibre with a distributed acoustic sensor arranged at each end of the fibre. For shorter lengths of pipeline however the fibre path may double back along the pipeline to provide additional sensors for monitoring.

Referring back to FIG. 2, an object, in this instance a pig 208, is located within the pipeline such that it is propelled within the pipeline in the direction 210 by the action of fluid flow within the pipeline. The pig may be inserted into the pipeline at a section of the pipeline (not shown) designed for inserting pigs.

Various types of pig are known for different purposes. For example cleaning spheres are one example of a simple pig. These comprise spheres of material designed to be propelled through the pipeline and effectively scrape the inner walls of the pipeline to remove build up of hydrocarbons 214 on the inner walls of the pipe. Complex inspection pigs are also known. An inspection pig may be a complex data collection apparatus that is adapted to inspect the pipeline for signs or damage or degradation which may lead to failure of the pipeline.

The pig is inserted in an upstream section of pipeline and is propelled through the pipeline, generally by action of the fluid that the pipeline is carrying. Thus inspection or cleaning of the pipeline can be performed without any significant interruption to operation of the pipeline. The pig is then collected at a pig retrieval section of the pipeline (not shown) and removed.

Passage of the pig is, as mentioned, often intended to occur without interruption of the operation of the pipeline. It is therefore necessary that the pig progress through the pipeline from the insertion point to the extraction point. Sometime however a pig may become stuck in the pipeline. For example, in oil pipelines build up 114 of waxy or semi-solid hydrocarbon may occur. If a large amount of such material has built up on the inner surface of the pipe, the pig may be unable to dislodge the material and may become stuck. Additionally or alternatively debris dislodged by the pig as it travels through the pipeline may build up in front of the pig and retard movement of the pig. If sufficient debris builds up the pig may become stuck.

Additionally if a section 216 of the pipe has buckled or become dented, for example through damage or deterioration of the pipeline, the pig may be unable to clear the damaged section and again may become stuck.

If a pig becomes stuck it may prevent a significant amount of flow. This can significantly impact on the operation of the pipeline and pipeline operation may need to be discontinued until the pig can be dislodged or removed. Clearly ceasing operation of the pipeline can have significant consequences and thus there is a desire to restart normal operation as soon as possible. Thus it is desirable to remove the pig as soon as possible. However in order to remove the pig, it must be located. Sections of pipelines that are covered by a single pig in a pigging run may be tens of kilometres long and pipelines are often buried underground. Thus finding and accessing a trapped pig is not trivial matter. It is therefore important to determine quickly and accurately where a trapped pig is located.

Even if the pig, when stuck, does not provide a significant flow impediment (some pigs may be arranged to open a flow valve on the pig in response to significant back-pressure) the presence of a blocked pig clearly creates an obstacle to a further pigging run. The fact that such a pig has become trapped may however not be apparent until the pig fails to appear at the extraction point (or at an inspection point) within the expected timescales of a pigging run.

Also, some inspection pigs are highly complex and expensive apparatus and such a pig being inoperative whilst trapped in a pipeline is itself a significant waste of resources.

The embodiment shown in FIG. 2 is able to detect when a pig has become trapped in real time and to provide the location of the pig. The embodiment shown in FIG. 2 detects pressure pulses in the pipeline 206 caused by motion of the pig within the pipeline.

The pipeline 206 comprises a series of continuous pipe sections joined together at joints 212. Joints 212 may for instance comprise girth welds. Such welds bond the sections of pipe together into the continuous pipeline. At the joints 212 however the internal surface of the pipe changes. It has been found that as a pig within a pipeline traverses a weld it encounters additional resistance to its passage through the pipeline. This leads to a build up of a slight overpressure behind the pig. As the pig clears the weld the pressure release causes an impulse which travels in both directions along the pipeline as a pressure wave.

The pressure pulse thus creates an acoustic disturbance in the location of the pig as girth weld or other restriction is passed. The pressure wave also however propagates for significant distances along the pipeline. The pipe acts as a waveguide and it has been found that the pulse can travel for tens of kilometres without being unduly attenuated. As the pulse passes through any particular length of pipe, it creates an acoustic disturbance which can be detected by the distributed fibre sensor 202.

Figure 4A:
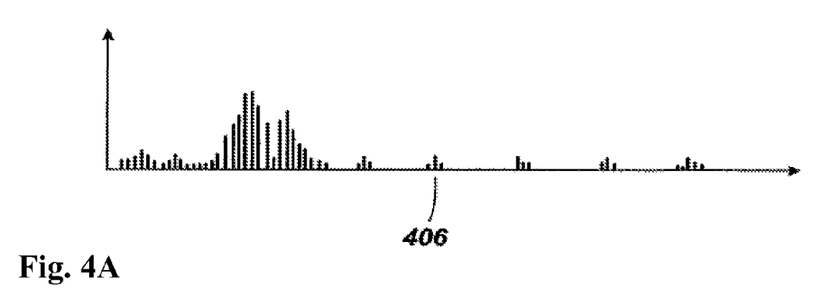
FIG. 4A, FIG. 4B, FIG. 5A and FIG. 5B show pipeline monitoring data outputs.
Figure 4B:
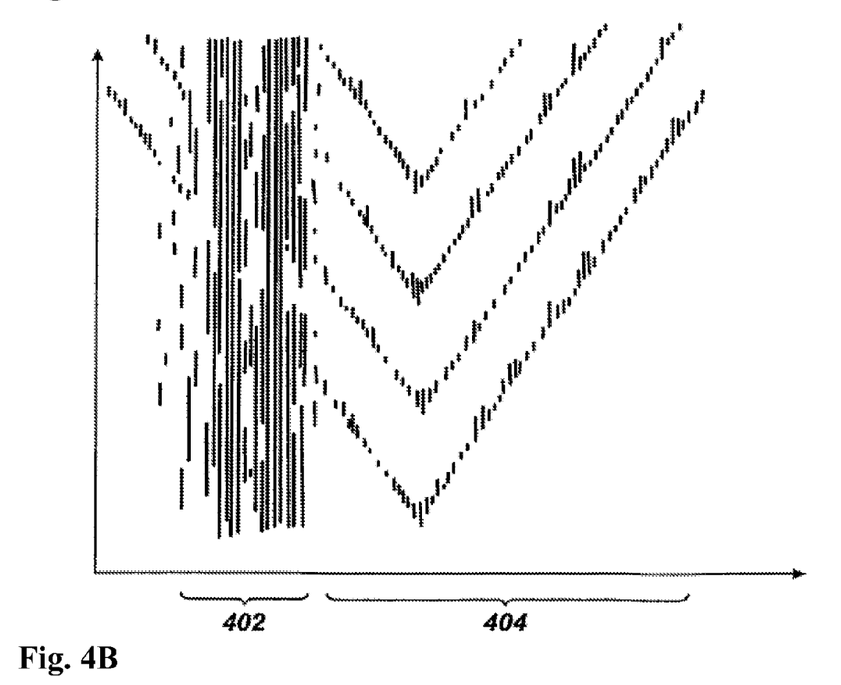

FIGS. 4A and 4B show a histogram and associated waterfall plot illustrating a distributed fibre sensor output in response to a series of pressure pulses introduced into an adjacent pipeline. Data in FIGS. 4A and 4B was produced by a sensing fibre in a conduit. The x-axis of the histogram and waterfall plot is the position along the length of the sensing fibre (which is this case has an overall length of approximately 40 km). As the fibre has a path which follows the pipeline the x-axis also corresponds to position along the pipeline.

The histogram shows, at an instant in time, the amplitude of the sensed acoustic signal returned from the sensing fibre. in order that all 4000 channels can be viewed, each bar in the diagram represents the peak amplitude from a group of 10 m sections. Individual 10 m sections could be viewed if desired. The lower plot is a representation of a waterfall plot with an update rate of 0.05 seconds showing sound intensity against distance and time. Time is plotted along the y-axis of the waterfall, with most recent data plotted at the top. The x-axis is again distance along the fibre, and hence pipeline, and the sound intensity, in a proper waterfall plot, would be represented by the colour/greyscale level of each data point. For the purposes of explanation however it can be taken that the waterfall of FIGS. 4A and 4B shows acoustic disturbance as a function of distance along the fibre against time.

Two main features can be seen from the waterfall plot. The first is an area of constant acoustic disturbance towards the left of the plot at 402, corresponding to a length of approximately 4000 m of the sensing fibre. This is attributable to an industrial unit located over that section of fibre, producing a steady vibrational noise. Secondly distinct chevron (i.e. V shaped) patterns can be seen, most clearly in region 404, away from the constant noise of the industrial unit.

The vertex of each chevron is located at point 406 along the fibre, corresponding to the origin of the pressure pulse. The 'V' shape of the plot corresponds to the pressure pulse moving along the pipe in both directions away from the source of the pulse, and the slope of the 'V' shape corresponds to the speed of sound in the pressurised fluid contained within the pipe which in this case is approximately 400 ms$^{-1}$. It can be seen that a series of pressure pulses are introduced into the fluid, in this instance pressurized gas, and multiple traces are formed. On the top histogram plot, the individual pulses appear in their respective positions at that instant, spaced along the fibre.

It can be seen therefore that a pressure pulse is clearly detectable in the pipeline using a distributed acoustic sensor. As movement of a pig in the pipeline will generate a repetitive series of pressure pulses such a repetitive series can be used to locate the pig within the pipeline. Preferably however the characteristic V shape, caused by propagation of the pressure pulse in the both directions within the pipeline, may be used as an acoustic signature of the pig.

The V shaped propagation may be used as a detection feature using a relatively simple algorithm.

Figure 6A:
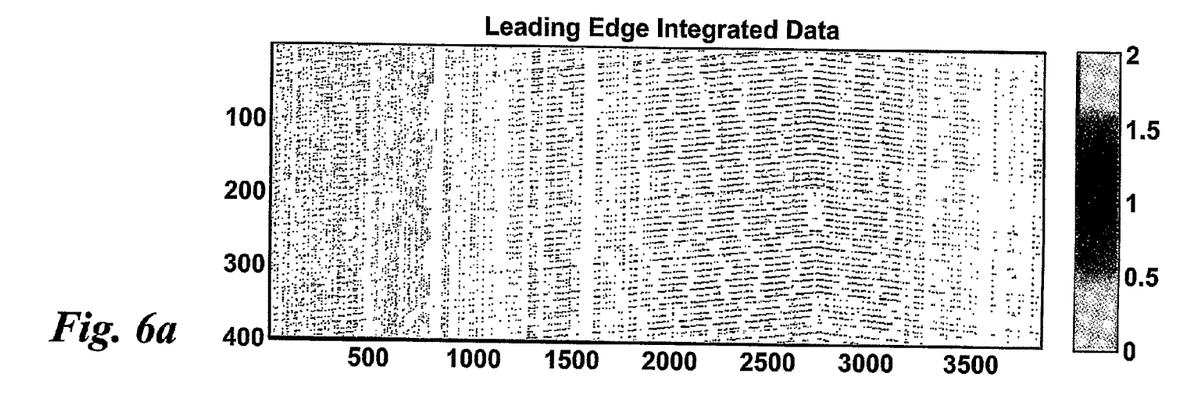
FIGS. 6a and 6b shows data outputs from a data tracking algorithm according to an embodiment of the invention.

First, a leading edge algorithm is used to detect the first detection made by each channel of the distributed acoustic sensor. This provides a cleanup and normalisation of the data. It will be appreciated that as the pressure pulse passes sections of the pipeline it acoustically excited those sections and each section may ring for a different period of time. By detecting the leading edge only the data is normalised. FIG. 6a shows a waterfall plot of acoustic of data obtained from the distributed acoustic sensor during a pigging run after normalisation. Time is plotted on the y-axis, this time with the most recent data on the bottom (i.e. the reverse of FIGS. 4A and 4B), and distance along the fibre is plotted on the x-axis. It can be sent that the normalised data removes the effect of ringing from the data The V shaped traces can be seen in this plot.

To simplify the detection a window of data is chosen such that only one pressure pulse is expected during the window. For a pig tracking algorithm, the expected frequency of pressure pulses caused by the pig crossing joints or welds can be estimated and the appropriate window chosen such that only one such pressure pulse is expected. Thus the algorithm may run every N frames looking at the previously acquired N frames of data.

For each set of N frames a search window of a subset of channels, i.e. acoustic channels, is selected as a search window. Reducing the number of channels in the search window reduced the processing required. For example a search window of 200 acoustic channels, i.e. discrete sensing portions of fibre, may be applied. In the present example each acoustic channel is 10 m long and so the search window corresponds to a window of 2 km of the 40 km length of pipeline monitored. The search window may be based on a previously detected or estimated position of the pig.

For a particular search window the data points are organised into a first and second subset based on their relative position to a test location. The first subset comprises the data corresponding to channels on one side of the test location and the second subset comprises data corresponding to channels on the other side of the test location, i.e. for a particular test location $x_1$ the data may be organised into a set of channels immediately upstream of position $x_1$ and a set of channels immediately downstream of $x_1$.

For each subset linear regression may be performed. The method may therefore comprise calculating sum_x, sum_y, sum_x$^2$, sum_y$^2$ and sum xy where x equals distance from the test position and y equals time.

Performing linear regression on each subset results in a equation representing the best fit line and a residual for each set.

The test location may then be changed and the method repeated from the new test location. The set of test locations trialled in this way may include each acoustic channel of the fibre or alternatively a restricted set of possible test locations may be based on an expected, or previously determined location of the pig, The set of test locations may also be based on locations where a significant acoustic disturbance was detected.

Once all the test locations have been analysed the method involves identifying the N sets that have the lowest residuals from the test fits. The perpendicular distance of each data point in the set from the line may then be calculated and the data points corresponding to 20% of the data points with the worst fit may be discarded to remove spurious outliers. The calculation for each of the identified test locations may then be repeated.

Finally a classification step may determine whether the test location gives rise to an acoustic signal which is a classifiable V shape. The classification may involve determining whether the best fit lines for the two data subsets have the correct gradient (i.e. in each case the disturbance is moving away from the test location) and whether each line has low residuals. Further the classification may look for whether the gradient matches an expected range of gradient and/or whether the gradient of each line is substantially equal. The classification step may be based on an expected gradient, given the properties of the pipeline material and/or a previously detected V shape. A requirement of low residuals for each of the two fits are necessary to exclude two pressure pulses which are unrelated and travelling in opposite directions from being mistaken as a pressure pulse generated by the pig. The residuals may be compared to a threshold level.

Figure 6B:
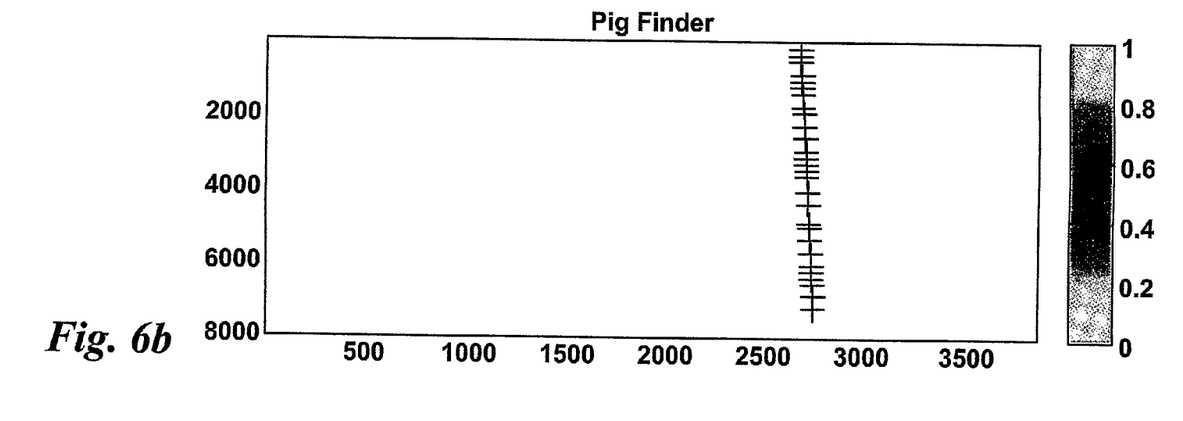

FIG. 6b shows the result of the pig tracking algorithm being applied to the data shown in FIG. 6a. It can be seen that the location and progress of the pig in the pipeline is clearly tracked based on the pressure pulses created by the pig as it travels through the pipeline.

The pressure wave created by the movement of the pig can be used as an acoustic signature to determine location of the pig. This can be used to track the location and speed of the pig. In the event that pressure pulses due to the movement of the pig through the pipeline are no longer detected this can be used as an indication that the pig has stopped moving, in which case the last known location can be used as an indication of the location of the pig.

The pressure pulses propagating through the pipeline can also be used to provide a condition profile of the pipeline.

Figure 5A:
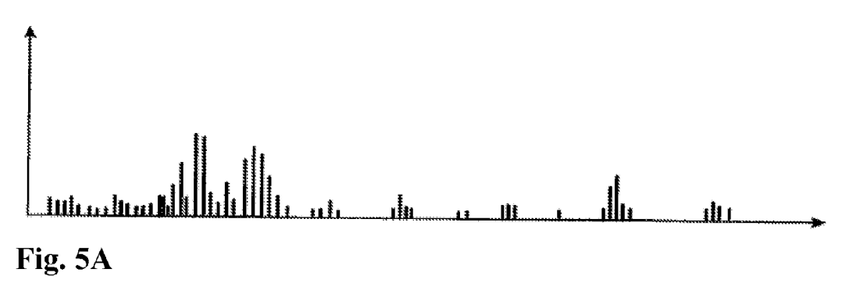
Figure 5B:
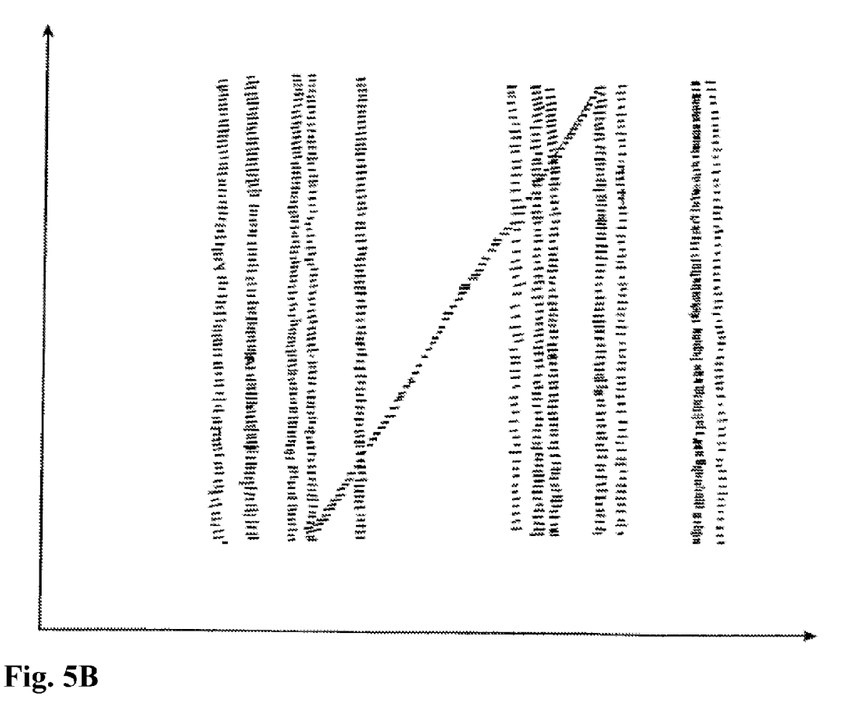

FIGS. 5A and 5B show data in a similar form to that of FIGS. 4A and 4B, but with the axes of both the histogram and the lower waterfall plot similarly resealed. In FIGS. 5A and 5B, the x-axis of the waterfall plot corresponds to a section of the sensing cable approximately 4 km long (as opposed to 40 km in FIGS. 4A and 4B) and the update rate of FIGS. 5A and 5B is set to 2 seconds (as opposed to 0.05 sec in FIGS. 4A and 4B).

Data for FIGS. 5A and 5B comes from the same pipe and fibre arrangement as in FIGS. 4A and 4B, and the path of the pig is clearly visible as a diagonal trace 502 in the waterfall plot. This illustrates that the repetitive series of pressure pulse may itself be used to track movement of the pig. Also visible in the waterfall plot of FIGS. 5A and 5B are a series of vertical lines having various intensities. The lines correspond to various locations along the length of the pipe, and can be considered as a fingerprint or barcode of the pipe, the pattern of lines corresponding to the physical characteristics or condition of the pipe, and to a certain extent its immediately surrounding environment (in this case the ground in which it is buried).

Considering the condition profile provided by this barcode effect, it will be understood that this corresponds to the chevron effect of FIGS. 4A and 4B, but viewed with a compressed time axis. The pressure pulses passing through the pipe can be thought of as acoustically 'illuminating' or exciting each portion of the pipe they pass through, eliciting a response from the pipe and its environment, whereby the response is detected by the distributed sensing fibre. By averaging over time, it can be seen that some sections of the pipe have a different response to the pulses than others. Possible causes of these differences include a local hydrocarbon build up on the pipe wall, a weakness in the pipe wall or variation in the wall profile, or variation in the ground composition in the vicinity of the pipe for example. In this way the plot provides a condition profile of the pipe at a given time or date.

Although not illustrated the spectral content of the sensed data can be extracted and provided. This would add an extra dimension to the plot of FIGS. 5A and 5B, and would enable enhanced condition monitoring capability. Seismic signals are typically dominant at frequencies below 500 Hz due to the high attenuation of higher frequencies through the ground.

For example, by looking at a selected frequency band or bands, the 'noise' from the industrial plant in region 402 of FIG. 4A could be filtered out A pipe profile or barcode as explained above, additionally decomposed by frequency provides more detail to a user and allows more sophisticated analysis. For example different types of physical phenomena may be associated with particular frequency bands. For instance, changes in the higher frequency bands may be indicative of turbulent flow in the pipe caused by the build-up of wax deposits whereas changes in the lower frequency band may be indicative of changes to the ground condition in which the pipe is laid. The interpreted results may therefore provide a greater quantity and quality of information to a user.

In order to provide condition monitoring when no pigging run is occurring an impulser may arranged at a point along the pipeline, and adapted to introduce a pressure pulse into the fluid in the pipe. The impulser can take a variety of forms, for example a hydraulic ram. The pressure pulse generated travels in both directions down the pipe, away from the impulser.

It will be understood that the present invention has been described above purely by way of example, and modification of detail can be made within the scope of the invention.

Each feature disclosed in the description, and (where appropriate) the claims and drawings may be provided independently or in any appropriate combination.

The invention claimed is:

1. A method of tracking movement of an object in a conduit comprising:
    taking data corresponding to signal returns from interrogation of a length of an optic fibre positioned along the path of said conduit to provide distributed acoustic sensing; and
    processing the returns from each of a plurality of discrete longitudinal sensing portions to detect an acoustic signature associated with movement of said object in said conduit and determine the origin of said acoustic signature;
    wherein the processing of the returns involves determining the presence of a pressure wave propagating through the conduit caused by travel of the object in the conduit, by determining the presence of a first acoustic disturbance travelling in a first direction past a plurality of successive longitudinal sensing portions.

2. A method as claimed in claim 1 wherein the acoustic signature comprises a series of pressure waves.

3. A method as claimed in claim 1 wherein the acoustic signature comprises first and second pressure acoustic disturbances propagating away from each other in opposite directions in the conduit.

4. A method as claimed in claim 1 wherein the step of processing the returns comprises applying a leading edge detection step to identify the leading edge of any acoustic disturbance detected by a discrete sensing portion.

5. A method as claimed in claim 1, wherein the length of said distributed fibre optic sensor is greater than or equal to 20 km.

6. A method as claimed in claim 1, wherein the method comprises tracking movement of the object in real time and generating an alert if the object stops moving and/or drops below a speed threshold.

7. A method as claimed in claim 1 wherein said conduit is a pipeline and the object is a pig.

8. A method as claimed in claim 1 comprising interrogating said optic fibre by repetitively launching a plurality of optical pulses into the fibre and detecting radiation which is Rayleigh backscattered from said optic fibre.

9. A computer program which, when run on a suitable computer, performs the method of claim 1.

10. A method of tracking movement of an object in a conduit comprising:
    taking data corresponding to signal returns from interrogation of an optic fibre positioned along the path of said conduit to provide distributed acoustic sensing; and
    processing the returns from each of a plurality of discrete longitudinal sensing portions to detect an acoustic signature associated with movement of said object in said conduit and determine the origin of said acoustic signature,
    wherein the step of processing the returns comprises the steps of, for each of a plurality of test positions along the conduit:
    forming a first subset of data corresponding to a plurality of frames of data from discrete sensing portions corresponding to portions of the conduit on one side of the test position ;
    forming a second subset of data corresponding to a plurality of frames of data from discrete sensing portions corresponding to portions of the conduit on the opposite side of the test position; and
    processing the first and second subsets to determine the presence of an acoustic disturbance in the first and second subsets propagating away from the test position.

11. A method as claimed in claim 10 wherein processing the first and second subsets comprises applying linear regression to each of the first and second subsets for each test position.

12. A method as claimed in claim 11 comprising identifying one or more test positions having the lowest residuals.

13. A method as claimed in claim 11 comprising the step of identifying test positions wherein the linear fit of the first set has a gradient within a first expected range and the linear fit of the second set has a gradient within a second expected range.

14. A method as claimed in claim 10 comprising the step of identifying test positions wherein the magnitude of the gradient for the linear fit for the first subset is substantially equal to the magnitude of the gradient for the linear fit for the second subset.

15. Apparatus for tracking a pig in a pipeline comprising:
    an optic fibre interrogator adapted to interrogate an optic fibre and provide distributed acoustic sensing; and a processor adapted to receive sensed data from said interrogator and determine the presence of an acoustic signature associated with movement of said pig in said pipeline and to determine the location of said pig wherein said processor is configured to determine the presence of a pressure wave propagating through the conduit by determining the presence of a first acoustic disturbance travelling in a first direction past a plurality of successive longitudinal sensing portions.

16. An apparatus as claimed in claim 15 wherein said processor is adapted to determine the presence of a pressure wave caused due to movement of the pig in the pipeline.

17. A real time pipeline monitoring apparatus comprising an apparatus as claimed in claim 15 wherein the processor is adapted to generate an alert if the pig stops moving and/or drops below a speed threshold.

18. An apparatus as claimed in claim 17 wherein said alert comprises an indication of the location of the pig in the pipeline.

* * * * *